Patented Mar. 18, 1952

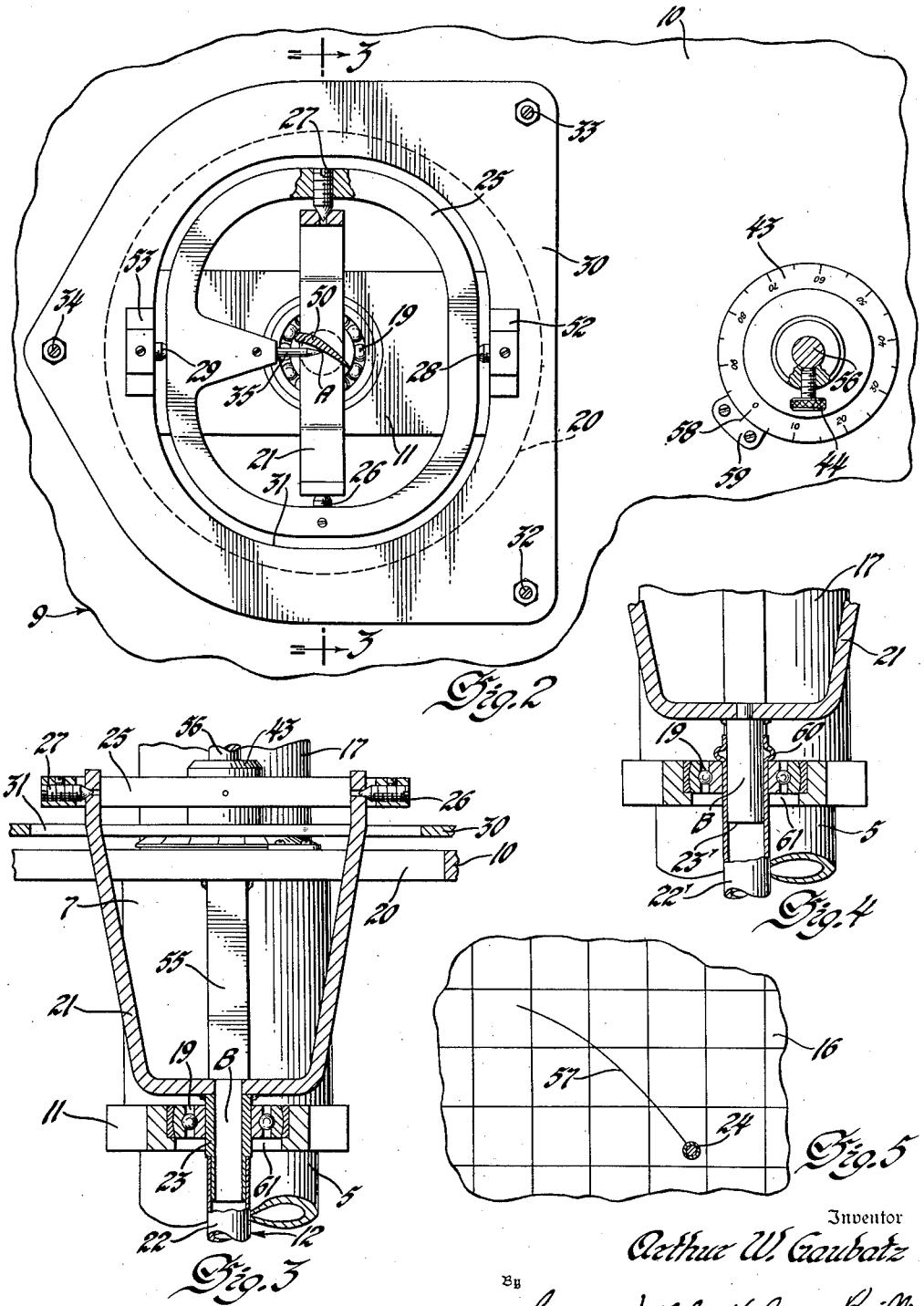

2,589,365

UNITED STATES PATENT OFFICE 2,589,365

CONTOUR DESCRIBING INSTRUMENT

Arthur W. Gaubatz, Indianapolis, Ind., assignor to General Motors Corporation, Detroit, Mich., a corporation of Delaware Application December 1, 1947, Serial No. 788,984

8 Claims. (Cl. 33—24)

This invention relates to geometrical instruments and particularly to an instrument for making enlarged reproduction of any desired contour or outline.

In the production of turbine blades or buckets for steam and gas turbines, for example, it is highly important for maximum turbine operating efficiency that the finished blades have the precise contour at each increment of blade length as was established by the designer. By making enlarged reproductions of the contour at each desired point on the blade and comparing these with the corresponding designed contours as shown on enlarged working drawings, a ready check is obtained on the accuracy of blade production. While the instrument embraced by this invention is believed to be particularly useful in checking turbine blade contours, it is also thought to be suitable generally for checking the contour or outline of any body.

It is therefore the principal object of this invention to provide an instrument for making enlarged reproductions of contours and outlines.

It is a further object to provide such an instrument having a tracing means and a reproducing means, together with means for precisely adjusting the relative positions of the tracing means and the body whose contour or outline is being traced in order that enlarged reproductions may be made of the contours or outlines at various precise locations on the body.

It is a still further object to provide such an instrument consisting of simply and cheaply constructed parts and capable of easy adjustment.

For a complete understanding of the invention reference is made to the following description, together with the drawings in which:

Figure 2 is an enlarged fragmentary view taken as indicated by the arrows 2—2 in Figure 1.

Figure 3 is a sectional view on line 3—3 of Figure 2, the turbine blade having been omitted.

Figure 4 is a sectional view similar to that of Figure 3 but showing a modification of a portion of the instrument embodying the invention.

Figure 5 is a fragmentary view taken as indicated by the arrows 5—5 in Figure 1, showing the drawing paper on the surface of the lower table with an enlarged reproduction formed thereon of a portion of the contour being traced.

Figure 1:
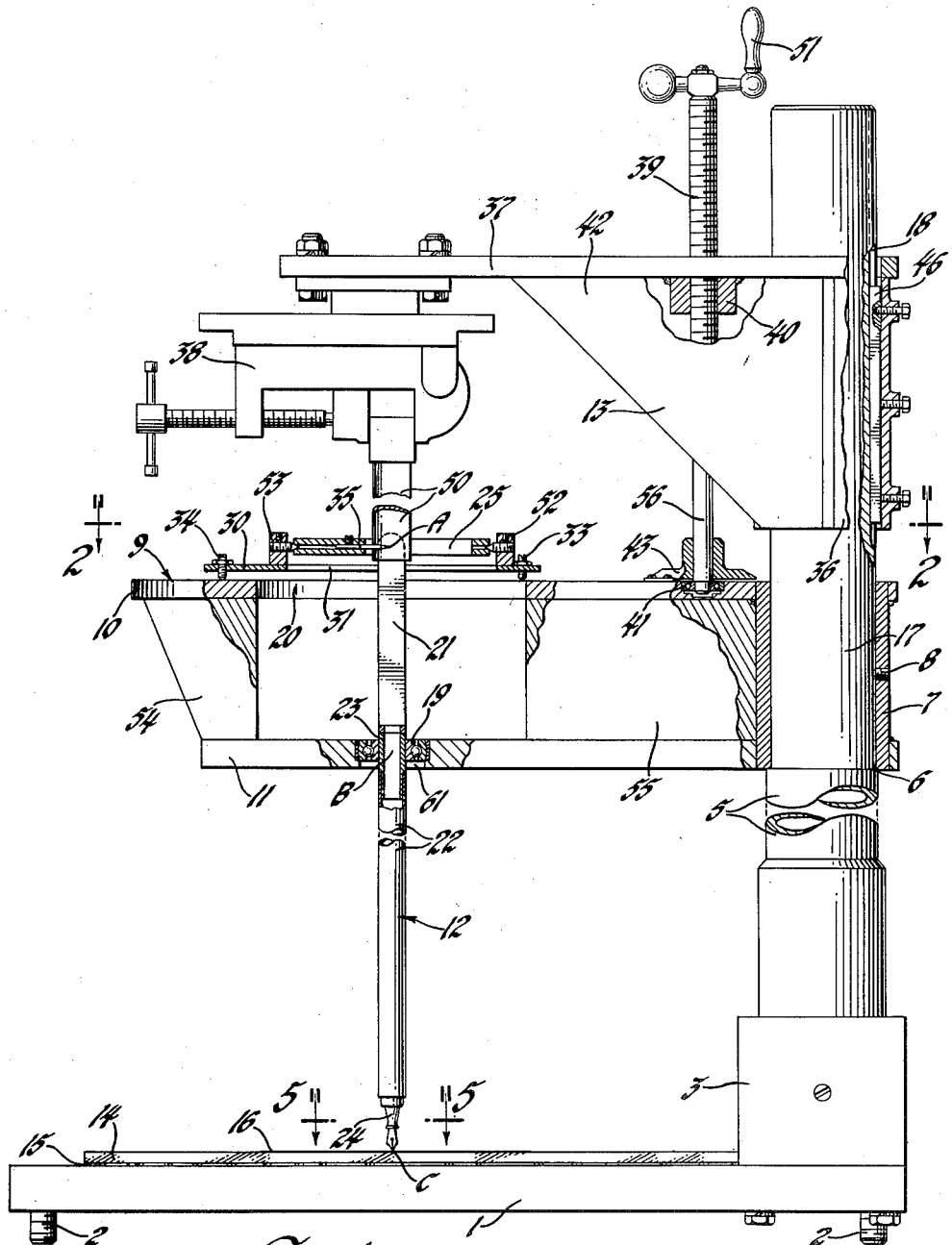
Figure 1 is a side elevational view showing an instrument embodying the invention, with parts broken away and in section and showing a turbine blade in position to have its contour traced and an enlargement thereof made by the instrument.

The instrument as shown in Figures 1-3 and 5 consists of five principal parts, namely, two vertically spaced horizontal tables 1 and 9, a vertical column 5, a pendulous member 12 and a work-supporting structure 13.

The lower table 1, which forms the base of the instrument, rests on adjustable leveling legs 2 and supports a glass surface plate 14 on a cork mat 15. The glass plate provides a smooth flat surface for a sheet of drawing paper 16 on which is produced the enlargement of the contour being traced.

The column 5 extends out of the column base 3 secured to the table 1 and serves both as a support for table 9 and as a guide for the work-supporting structure 13. The upper portion 17 of column 5 is reduced in diameter at shoulder 6 and is also provided with a longitudinal keyway 18.

The upper table 9 includes upper and lower horizontal plates 10 and 11, spaced apart and secured together by webs 54 and 55. Extending at a right angle through the plates 10 and 11 and welded thereto is a cylindrical member 7 which is sleeved to the upper portion of column 5 and has its lower end resting on the shoulder 6. One or more set screws 8 are provided in the member 7 for locking the table 9 to the colmn 5. The upper plate 10 has a large aperture 20, and axially aligned therewith in lower plate 11 is an aperture 61 in which is secured a spherically seated or self-aligning annular bearing 19.

The member 12 comprises a U-shaped member 21 and a tubular section 22, these two parts being joined together by a short cylindrical member 23 which is welded at its upper end to the member 21 and has its lower end pressed or shrunk fitted into the upper end of section 22. The outer cylindrical surface of member 23 makes a close free-sliding fit in the bore of bearing 19, and the upper end of the U-shaped member 21 extends through the opening 20 in the upper plate 10. Telescopically slidable in the lower end of tubular section 22 is a weighted marking instrument, such as pen 24, having a point C which rests on the surface of drawing paper 16 on table 1.

The weight of the member 12 is supported on the upper surface of table 9 through a gimbal ring 25, which is pivotally connected to the two arms of U-shaped member 21 by adjustable pivots 26 and 27 and at 90° thereto, and in the same plane as the pivots 26 and 27, to opposite sides of a planchette 30 by adjustable pivots 28 and 29 mounted in pedestals 52 and 53. The planchette 30 has an aperture 31 to provide clearance for the U-shaped member 21 and is supported on adjustable spherical-end legs 32—34 which allow it to slide freely over the surface of plate 10. The gimbal ring 25 carries a tracing pointer 35, which is co-axial with pivots 28 and 29 and adjustably mounted to bring the point A of the pointer in line with the pivots 26 and 27. The point A may then be brought into line with the longitudinal axis of member 12 by adjustment of the pivots 26 and 27.

The work-supporting structure 13 comprises a sleeve-like member 36 having a free sliding fit on column portion 17 and rotatably locked thereto by key 46, a plate 37 with braces 42 secured to the sleeve and to which is mounted a work holding vise or clamp 38, and a height adjusting lead screw 39 which threadedly engages a nut 40 fixed to plate 37 and has an unthreaded portion 56 which pivots in thrust bearing 41 mounted in upper plate 10.

The lead screw 39 and nut 40 each have ten threads to the inch, and the lead screw has a dial 43 releasably secured thereto by thumbscrew 44 and graduated in hundredths. Adjustments of the height of work-supporting structure 13 can thus be made in thousandths inches as indicated on the dial with reference to a fixed mark 58 on a plate 59 secured to table 9.

In constructing the instrument, the vertical distance from point B which represents the center about which the member 12 rotates and fulcrums in bearing 19, to the surface of the drawing paper 16 on the glass plate 14 is preferably made an even multiple (such as 10 times) the vertical distance from point B to the horizontal plane through point A. In an instrument constructed as herein described and which operates entirely satisfactorily the afore-mentioned distances were made 55.000 and 5.500 inches, respectively.

The manner of operation of the device will now be described. After first making adjustments to bring point A of the pointer 35 coincident with the longitudinal axis of member 12, an article such as a turbine blade 50 is clamped in vise 38 so that the plane of the contour to be traced is horizontal and approximately in the center of the opening 20. Vertical adjustment is then made of the work-supporting structure 13 by turning lead screw 39 with handle 51 until the plane of the contour to be checked is coincident with the horizontal plane through point A. A sheet of drawing paper 16 is next placed under point C of pen 24 and secured in any desired manner to the glass plate 14. Then by slidably moving the planchette 30 about over the surface of plate 10, the point A of the pointer may be made to trace the contoured surface of the blade 50, during which action the member 12 slides through bearing 19 and rotates and rocks or fulcrums about the point B thereof, and the weighted pen 24 telescopically slides in the lower end of the lever to keep the point C in a horizontal plane on the surface of the paper where it makes an enlarged reproduction (indicated by line 57 in Figure 5) of the contour being traced by point A. Additional reproductions may be made of the contours at various increments along the blade length by successive adjustments of the height of the work-supporting structure 13 through turning the lead screw 39 the desired increments as indicated on the dial 43.

The modified construction shown in Figure 4 differs from that heretofore described in that tubular section 22' (corresponding to tubular section 22 in Figures 1 and 3) is secured to the bearing 19, and member 23 is telescopically slidable in the upper end of section 22' to permit variations in lineal distance between points A and B during operation of the instrument. The tubular section 22' may be secured to the bearing as shown in Figure 4 by means of a bead 60 formed adjacent the upper end of the tube. An advantage of this modified construction lies in the fact that the planchette is more easily moved over the surface of plate 10 during operation, on account of its being relieved of a large part of the weight of member 12.

I claim:

1. A device of the class described, comprising two vertically spaced parallel surfaces, a bearing mounted below the upper of said surfaces, a member mounted in the bearing, a marking instrument resting on the lower of said surfaces and connected to the member below the bearing, a tracing instrument, and means connected to the member above the bearing for maintaining the tracing instrument in a plane parallel to and at a constant height above the upper of said surfaces, said means including a gimbal ring to which said tracing instrument is fixed.

2. A device of the class described, comprising two vertically spaced tables each having a horizontal top surface, a self-aligning bearing secured to the upper table and having a vertically alignable bore, a member having a shaft section extending through said bore and having a U-shaped upper end, a weighted marking instrument telescopically connected to the lower end of the member and resting on the horizontal top surface of the lower table, a planchette slidably resting on the horizontal top surface of the upper table, a gimbal ring pivotally connected to said planchette and to the U-shaped upper end of said lever, and a tracing instrument secured to said gimbal ring.

3. An instrument which includes vertically spaced parallel tables, a member which extends between the tables, a bearing between the tables in which the member may move lengthwise of itself and rotate and rock, a member which supports and to which the first specified member is connected so that it may rock about a point with respect thereto mounted to move on the upper table, a tracing member which terminates at the point about which the first specified member rocks with respect to the second specified member, and a describing member weighted to rest on the lower table and movable lengthwise of the first specified member to maintain it in contact with the lower table.

4. A device of the class described, comprising two vertically spaced parallel surfaces, a bearing positioned between the surfaces, an elongated member fulcrumed in said bearing, a plate slidably resting on the upper surface, a gimbal ring pivotally interconnecting said member and plate, a tracing instrument carried by the gimbal ring, and a marking instrument resting on the lower surface and connected to said member below the bearing.

5. In a device of the class described, a table, a column rigidly connected and extending perpendicular thereto, a work supporting structure engaging the column and adjustably movable axially thereof, a second table rigidly connected to the column between the first named table and the work supporting structure, a lead screw thrustably anchored to the second table and in threaded engagement with the work supporting structure for adjustably positioning the latter at desired distances from the second table, a planchette slidable over the surface of the second table and carrying a gimbal ring pivoted thereto, a tracing instrument fixed to the gimbal ring, a pendulous member pivoted to the ring and carrying a tracing instrument in engagement with the first named table, and a bearing supported by the second table providing a fixed fulcrum point for said member.

6. In a device of the class described, a vertical column, a horizontal table rigidly supported thereby, a work supporting structure overhanging the table and slidably secured to the column, screw threaded means interconnecting the table and work supporting structure for adjustably raising and lowering the latter on said column, a pendulous member carrying a marking instrument at its lower end, a planchette movably resting on the table, a gimbal ring pivotally connecting the upper end of said member to the planchette, and a tracing instrument fixed to the gimbal ring.

7. In a device of the class described, a table, a planchette slidable over the surface of the table and carrying a gimbal ring pivoted thereto, a tracing instrument fixedly attached to the ring, an elongated member pivoted at one end to the ring and carrying a marking instrument telescopically slidable in its other end, a bearing secured to the table providing a fixed fulcrum point for said member, a column fixedly supporting the table, a work supporting structure slidably engaging the column, and a lead screw anchored to the table and threadedly engaging the work supporting structure.

8. A device of the class described, comprising a vertically extending column, a movable tracing instrument, means for maintaining said tracing instrument in a horizontal plane and at a constant elevation during movements thereof, a structure slidably engaging said column and adapted to support a workpiece, means for adjustably raising and lowering said structure independently of the tracing instrument, a member pivotally connected at one end to said first mentioned means and carrying a marking instrument at its opposite end, and a bearing adapted to serve as a fixed fulcrum point for said member intermediate said tracing instrument and said marking instrument.

ARTHUR W. GAUBATZ.

REFERENCES CITED

The following references are of record in the file of this patent:

UNITED STATES PATENTS

| Number | Name | Date |
|---|---|---|
| 37,235 | Ives | Dec. 23, 1862 |
| 190,797 | Ware | May 15, 1877 |
| 366,987 | Westlake | July 19, 1887 |
| 1,039,713 | Eaton | Oct. 1, 1912 |
| 1,180,906 | Clark | Apr. 25, 1916 |
| 2,352,695 | Clausing et al. | July 4, 1944 |

FOREIGN PATENTS

| Number | Country | Date |
|---|---|---|
| 413,326 | Germany | May 13, 1925 |